C. H. ALKER.
DUMPING BODY.
APPLICATION FILED MAR. 29, 1920.
1,381,099.
Patented June 14, 1921.
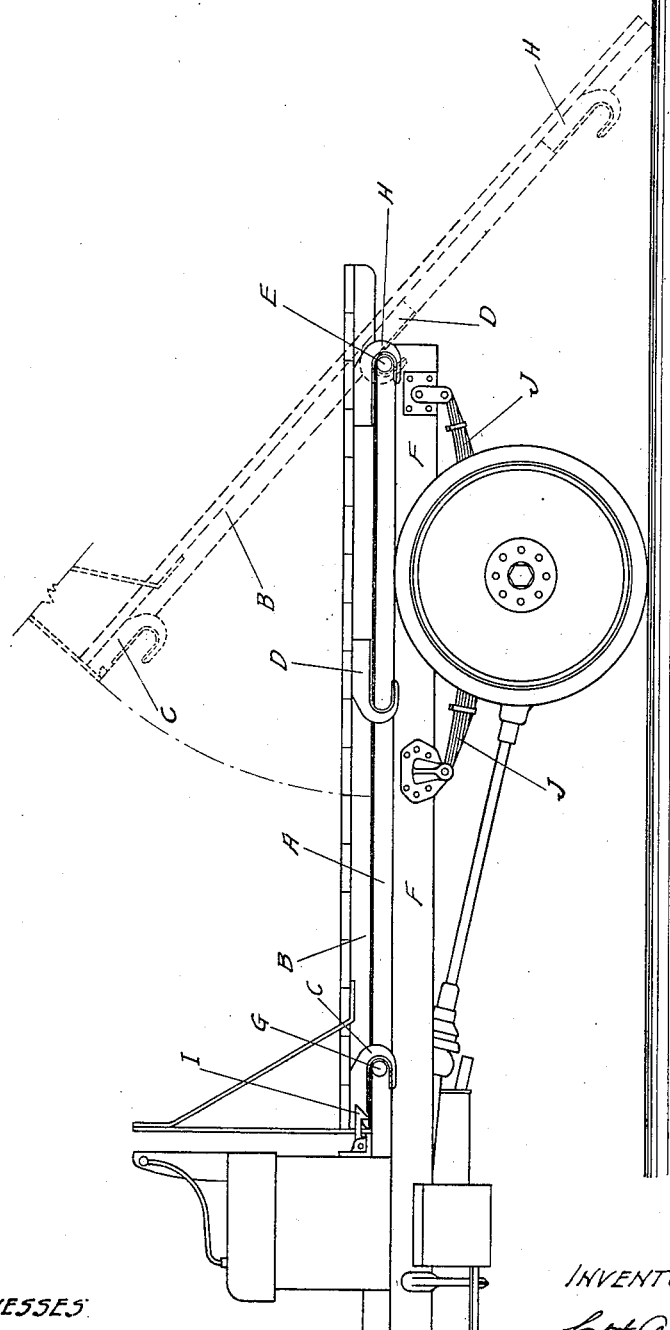

UNITED STATES PATENT OFFICE.

CLARENCE H. ALKER, OF NEW ORLEANS, LOUISIANA.

DUMPING-BODY.

1,381,099. Specification of Letters Patent. Patented June 14, 1921.

Application filed March 29, 1920. Serial No. 369,819.

*To all whom it may concern:*

Be it known that I, CLARENCE HENRY ALKER, a citizen of the United States, residing at No. 2232 Wirth Place, in the city of New Orleans, parish of Orleans, and State of Louisiana, have invented a new and useful Dumping-Body, of which the following is the specification.

My invention relates to improvements in automatic dumping and re-setting truck bodies in which the inclination of the truck body caused by means of the compression of the rear springs of the truck, caused by the weight of the load, is utilized to effect the dumping, and upon the removal of the weight from the springs, the reversed inclination of the truck frame brings about the re-setting and locking of the body. When the truck is not being operated on level ground the same results are obtained by taking advantage of the inertia of the movable portion of the body and the load.

The objects of my invention are, first, to provide a truck body which can be quickly and effectively unloaded without the application of any mechanical power or manual labor other than the mere release by the driver of the locking device, or when operated on other than level ground by the mere starting and stopping of the truck proper; second, in addition to accomplishing the above dumping or unloading, to provide a body which will automatically return to the loading position and lock in that position without the operation of any force other than that of gravity, unless the truck is not on level ground, in which case this object is to be accomplished by starting and stopping the truck.

I attain these objects by the general arrangement shown in the accompanying drawing—

The figure shows the elevation of truck with a very simple form of body shown solid in the load carrying position and dotted in dumping position.

Any form of truck body may be used with the arrangements hereafter described.

F is the frame of motor truck; A is the bed or track upon which the movable portion of body B rolls upon wheels or rollers operating on ball or roller bearings. The rollers or wheels may be attached to either A or B and roll on either B or A. C, D and H are some form of hook or other arrangement which will accomplish the same purpose, to limit the travel of the movable portion of body in the dumping and re-setting process, and to hold the body B in position against road shocks. These locks or other devices operate against the stops G and E. I is the latch or locking device arranged to latch the body automatically upon its return to the loading position and to hold it perfectly locked in that position until released from the driver's seat. The form of this locking device is of no importance to the patent request. J represents the rear springs of the truck.

The operation is as follows:—normally, when the truck is on level ground without load, the frame F of the truck is at an inclination from the horizontal, sloping toward the front of the truck. As the truck is loaded the springs J J are compressed and the inclination of the frame F gradually changes until the slope is toward the rear of the truck. In this position the body B has a tendency to roll toward the rear of the truck and is held in place by the latch I. When it is desired to dump the load the latch I is released, when if the truck is on level ground, the body B with its load will roll on the ball-bearing wheels or rollers on track A toward the rear of the truck. If the truck is not on level ground the same effect is produced by starting up truck, allowing the inertia of body B and its load to cause it to roll toward the rear of the truck, or the same effect is produced by backing up of the truck and stopping suddenly. The body B with its load rolls to the rear until the hook or other device D engages the stop E at which time the inertia of the body and its load produce a moment of rotation about the point E which causes the body to rotate and assume the position shown in dotted lines, thus dumping the load. The truck is then started and upon the body being free of any portion of the load which rests upon the ground end, it returns to the horizontal position as the end C of the body is made slightly heavier than the after end. Having returned to the horizontal position the springs J J have been relieved of their load and have raised the after end of the frame F until it is again inclined toward the front of the truck. The body B therefore rolls forward and is locked in position by the latch I. If the truck is not on level ground the same effect is produced by starting the truck and stopping suddenly.

I claim:

The combination with a chassis having side members normally supported at their front ends on the front axle, of a rear truck mounted beneath the said side members near their rear ends, springs supporting said side members and adapted to normally tilt said side members downward and forward, but adapted to yield and reverse the angle of tilt of said side members when subjected to the weight of the load on the wagon when the wagon is loaded, a wagon body slidably mounted on said side members and provided with a pivot to the rear of the center of gravity of said wagon body when empty, with means for limiting the forward travel of the wagon body as it returns to the initial position, and means for normally holding the wagon body when located in the forward position, substantially as described.

C. H. ALKER.

Witnesses:
FRANK W. HUNT,
GABIEN J. LEVANDOIS.